US012624179B2

(12) United States Patent
Shin et al.

(10) Patent No.: US 12,624,179 B2
(45) Date of Patent: May 12, 2026

(54) METHOD FOR PREPARING SUPER ABSORBENT POLYMER

(71) Applicant: LG Chem, Ltd., Seoul (KR)

(72) Inventors: Kwangin Shin, Daejeon (KR); Jin Hyuck Ju, Daejeon (KR); Hyungki Yoon, Daejeon (KR); Taebin Ahn, Daejeon (KR); Dong Hoon Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 680 days.

(21) Appl. No.: 18/028,295

(22) PCT Filed: Dec. 17, 2021

(86) PCT No.: PCT/KR2021/019244
§ 371 (c)(1),
(2) Date: Mar. 24, 2023

(87) PCT Pub. No.: WO2022/131835
PCT Pub. Date: Jun. 23, 2022

(65) Prior Publication Data
US 2024/0018321 A1     Jan. 18, 2024

(30) Foreign Application Priority Data

Dec. 18, 2020   (KR) ........................ 10-2020-0178433
Dec. 16, 2021   (KR) ........................ 10-2021-0180293

(51) Int. Cl.
| | |
|---|---|
| *C08J 3/075* | (2006.01) |
| *C08J 3/12* | (2006.01) |
| *C08J 3/24* | (2006.01) |
| *C08J 9/00* | (2006.01) |
| *C08J 9/14* | (2006.01) |
| *C08J 9/16* | (2006.01) |

(52) U.S. Cl.
CPC ............. *C08J 9/0052* (2013.01); *C08J 3/075* (2013.01); *C08J 3/12* (2013.01); *C08J 3/245* (2013.01); *C08J 9/141* (2013.01); *C08J 9/16* (2013.01); *C08J 2203/14* (2013.01); *C08J 2203/22* (2013.01); *C08J 2333/02* (2013.01)

(58) Field of Classification Search
CPC ... C08J 9/0052; C08J 3/075; C08J 3/12; C08J 3/245; C08J 9/141; C08J 9/16; C08J 2203/14; C08J 2203/22; C08J 2333/02; C08J 2433/02; C08J 2201/026; C08J 9/32; C08F 220/06; C08K 5/098; C08K 9/10
See application file for complete search history.

(56) References Cited

U.S. PATENT DOCUMENTS

| | | | |
|---|---|---|---|
| 5,985,944 A | 11/1999 | Ishizaki et al. | |
| 6,107,358 A | 8/2000 | Harada et al. | |
| 6,251,960 B1 | 6/2001 | Ishizaki et al. | |
| 7,282,262 B2 | 10/2007 | Adachi et al. | |
| 2005/0118423 A1 | 6/2005 | Adachi et al. | |
| 2007/0066167 A1 | 3/2007 | Wada et al. | |
| 2008/0269372 A1 | 10/2008 | Dairoku et al. | |
| 2009/0191408 A1* | 7/2009 | Tian ........................ | A61L 15/22 |
| | | | 528/480 |
| 2009/0239995 A1 | 9/2009 | Bub et al. | |
| 2011/0238026 A1 | 9/2011 | Zhang et al. | |
| 2011/0301560 A1 | 12/2011 | Fujimura et al. | |
| 2011/0313113 A1 | 12/2011 | Sakamoto et al. | |
| 2012/0001122 A1 | 1/2012 | Wattebled et al. | |
| 2012/0184670 A1 | 7/2012 | Kobayashi et al. | |
| 2012/0184684 A1 | 7/2012 | Funk et al. | |
| 2012/0220452 A1 | 8/2012 | Matsumoto et al. | |
| 2012/0258851 A1 | 10/2012 | Nakatsuru et al. | |
| 2013/0158495 A1 | 6/2013 | Handa et al. | |
| 2013/0274088 A1 | 10/2013 | Handa et al. | |
| 2015/0011388 A1 | 1/2015 | Matsumoto et al. | |
| 2015/0093575 A1 | 4/2015 | Naumann et al. | |
| 2015/0129799 A1 | 5/2015 | Kobayashi et al. | |
| 2015/0157759 A1 | 6/2015 | Azad et al. | |
| 2015/0158015 A1 | 6/2015 | Tanimura et al. | |
| 2015/0299404 A1 | 10/2015 | Daniel et al. | |
| 2016/0280825 A1 | 9/2016 | Bauer et al. | |
| 2016/0354757 A1 | 12/2016 | Lee et al. | |
| 2016/0375171 A1 | 12/2016 | Omori et al. | |
| 2018/0037686 A1 | 2/2018 | Lee et al. | |
| 2018/0194904 A1 | 7/2018 | Lee et al. | |
| 2018/0318793 A1 | 11/2018 | Yoon et al. | |
| 2019/0085104 A1 | 3/2019 | Yoon et al. | |

(Continued)

FOREIGN PATENT DOCUMENTS

| | | |
|---|---|---|
| AU | 2004209957 B2 | 6/2006 |
| CN | 1140458 A | 1/1997 |

(Continued)

OTHER PUBLICATIONS

International Search Report for PCT/KR2021/019242, mailed Apr. 1, 2022. 3 pages.
International Search Report for PCT/KR2021/019244, mailed Apr. 5, 2022. 2 pages.
International Search Report for PCT/KR2021/019246 mailed Apr. 5, 2022. 3 pages.
International Search Report for PCT/KR2021/019247, mailed Mar. 31, 2022. 2 pages.
International Search Report for PCT/KR2021/019249, mailed Mar. 31, 2022. 2 pages.
Lee, et al., "Super Absorbent Polymer and Preparation Method Thereof." U.S. Appl. No. 18/027,543, filed Mar. 21, 2023.
Odian, G. "Principles of Polymerization" Dec. 1981, p. 203, Wiley Interscience Publication.

(Continued)

*Primary Examiner* — K. Boyle
(74) *Attorney, Agent, or Firm* — Lerner David LLP

(57) ABSTRACT

The present disclosure relates to a method for preparing a super absorbent polymer. More specifically, the above method performs a polymerization reaction of a monomer in the presence of an aqueous dispersion of hydrophobic particles, and thus a super absorbent polymer having an improved absorption rate can be prepared without deterioration in absorption properties.

20 Claims, No Drawings

(56) References Cited

U.S. PATENT DOCUMENTS

| | | | |
|---|---|---|---|
| 2019/0119452 A1* | 4/2019 | Yoon | C08F 20/06 |
| 2019/0217272 A1 | 7/2019 | Hong et al. | |
| 2019/0344243 A1 | 11/2019 | Lee et al. | |
| 2020/0188876 A1 | 6/2020 | Kim et al. | |
| 2021/0009725 A1 | 1/2021 | Nam et al. | |
| 2021/0023529 A1 | 1/2021 | Lee et al. | |
| 2021/0069674 A1* | 3/2021 | Jung | C08J 3/24 |
| 2021/0146336 A1 | 5/2021 | Kim et al. | |
| 2021/0169709 A1 | 6/2021 | Bauer et al. | |
| 2021/0230377 A1 | 7/2021 | Lee et al. | |
| 2021/0309777 A1 | 10/2021 | Lee et al. | |
| 2022/0016599 A1 | 1/2022 | Lee et al. | |
| 2022/0071818 A9 | 3/2022 | Bauer et al. | |
| 2023/0331933 A1 | 10/2023 | Sohn et al. | |
| 2023/0347317 A1 | 11/2023 | Yoon et al. | |
| 2023/0374232 A1 | 11/2023 | Ryu et al. | |
| 2024/0018321 A1 | 1/2024 | Shin et al. | |

FOREIGN PATENT DOCUMENTS

| | | | | |
|---|---|---|---|---|
| CN | 1179433 A | 4/1998 | | |
| CN | 1697859 A | 11/2005 | | |
| CN | 102245680 A | 11/2011 | | |
| CN | 102317329 A | 1/2012 | | |
| CN | 102548654 A | 7/2012 | | |
| CN | 102712712 A | 10/2012 | | |
| CN | 103080139 A | 5/2013 | | |
| CN | 104024281 A | 9/2014 | | |
| CN | 104072928 A | 10/2014 | | |
| CN | 108350189 A | 7/2018 | | |
| CN | 108884241 A | 11/2018 | | |
| CN | 109923157 A | 6/2019 | | |
| CN | 110167997 A | 8/2019 | | |
| CN | 110914347 A | 3/2020 | | |
| CN | 111433258 A | 7/2020 | | |
| CN | 111433261 A | 7/2020 | | |
| CN | 112040919 A | 12/2020 | | |
| EP | 0744435 B1 | 9/2003 | | |
| EP | 1374919 A2 | 1/2004 | | |
| EP | 1592750 A1 | 11/2005 | | |
| EP | 1837348 A1 | 9/2007 | | |
| EP | 2399944 A1 | 12/2011 | | |
| EP | 2518092 A1 | 10/2012 | | |
| EP | 2589613 A1 | 5/2013 | | |
| EP | 2615117 A1 | 7/2013 | | |
| EP | 2650025 A1 | 10/2013 | | |
| EP | 3412710 A1 | 12/2018 | | |
| EP | 3540001 A1 | 9/2019 | | |
| EP | 3650491 A1 | 5/2020 | | |
| EP | 3708606 A1 | 9/2020 | | |
| EP | 3747938 A1 | 12/2020 | | |
| EP | 3757153 A1 | 12/2020 | | |
| EP | 3819330 A1 | 5/2021 | | |
| EP | 3872118 A1 | 9/2021 | | |
| JP | H06057010 A | 3/1994 | | |
| JP | H07267894 A * | 10/1995 | | |
| JP | H08253615 A | 10/1996 | | |
| JP | H10251310 A | 9/1998 | | |
| JP | 2002212331 A | 7/2002 | | |
| JP | 2002265528 A | 9/2002 | | |
| JP | 2004-261796 A | 9/2004 | | |
| JP | 2005097569 A | 4/2005 | | |
| JP | 3657287 B2 | 6/2005 | | |
| JP | 2006169385 A | 6/2006 | | |
| JP | 2006342306 A | 12/2006 | | |
| JP | 2008297512 A | 12/2008 | | |
| JP | 2011092930 A | 5/2011 | | |
| JP | 2011252080 A | 12/2011 | | |
| JP | 2012143755 A | 8/2012 | | |
| JP | 2012522880 A | 9/2012 | | |
| JP | 2013521962 A | 6/2013 | | |
| JP | 2014005472 A | 1/2014 | | |
| JP | 2015174971 A | 10/2015 | | |
| JP | 5871803 B2 | 3/2016 | | |
| JP | 5948532 B2 | 7/2016 | | |
| JP | 6013414 B2 | 10/2016 | | |
| JP | 2019-518839 A | 7/2019 | | |
| JP | 2019-519663 A | 7/2019 | | |
| JP | 2019518815 A | 7/2019 | | |
| JP | 2020520402 A | 7/2020 | | |
| JP | 2021505716 A | 2/2021 | | |
| JP | 2021516720 A | 7/2021 | | |
| JP | 2021518874 A | 8/2021 | | |
| JP | 2021521924 A | 8/2021 | | |
| KR | 20050016324 A | 2/2005 | | |
| KR | 20070004669 A | 1/2007 | | |
| KR | 100769976 B1 | 10/2007 | | |
| KR | 20110114535 A | 10/2011 | | |
| KR | 20140102264 A | 8/2014 | | |
| KR | 20140125420 A | 10/2014 | | |
| KR | 20140143292 A * | 12/2014 | | D21H 21/56 |
| KR | 101511820 B1 | 4/2015 | | |
| KR | 20150087368 A | 7/2015 | | |
| KR | 20150132035 A | 11/2015 | | |
| KR | 20170020113 A | 2/2017 | | |
| KR | 20170033634 A | 3/2017 | | |
| KR | 20170075643 A | 7/2017 | | |
| KR | 20190026355 A | 3/2019 | | |
| KR | 20190069311 A | 6/2019 | | |
| KR | 20190072298 A | 6/2019 | | |
| KR | 20190075574 A | 7/2019 | | |
| KR | 20190114777 A | 10/2019 | | |
| KR | 20200055449 A | 5/2020 | | |
| KR | 2020-0075605 A | 6/2020 | | |
| KR | 20200071032 A | 6/2020 | | |
| KR | 20200075196 A | 6/2020 | | |
| KR | 20200085615 A | 7/2020 | | |
| KR | 20200128969 A | 11/2020 | | |
| KR | 102191077 B1 | 12/2020 | | |
| WO | 1996017884 A1 | 6/1996 | | |
| WO | 2004069936 A1 | 8/2004 | | |
| WO | 2010073658 A1 | 7/2010 | | |
| WO | 2010095427 A1 | 8/2010 | | |
| WO | 2011040472 A1 | 4/2011 | | |
| WO | 2011078298 A1 | 6/2011 | | |
| WO | 2012033025 A1 | 3/2012 | | |
| WO | 2012108253 A1 | 8/2012 | | |
| WO | 2012133734 A1 | 10/2012 | | |
| WO | 2014196789 A1 | 12/2014 | | |
| WO | 2015093594 A1 | 6/2015 | | |
| WO | 2019117541 A1 | 6/2019 | | |
| WO | 2019190120 A1 | 10/2019 | | |
| WO | 2019201668 A1 | 10/2019 | | |
| WO | 2020-101287 A1 | 5/2020 | | |
| WO | 2020122559 A1 | 6/2020 | | |
| WO | 2020-145548 A1 | 7/2020 | | |
| WO | 2020144948 A1 | 7/2020 | | |
| WO | 2020-226385 A1 | 11/2020 | | |
| WO | 2021132266 A1 | 7/2021 | | |

OTHER PUBLICATIONS

Ryu, et al., "Super Absorbent Polymer and Preparation Method Thereof." U.S. Appl. No. 18/028,282, filed Mar. 24, 2023.

Schwalm, R. "UV Coatings Basics, Recent Developments and New Application," Elsevier Science, Dec. 21, 2006, p. 115.

Sohn, et al., "Method for Preparing Super Absorbent Polymer." U.S. Appl. No. 18/027,439, filed Mar. 21, 2023.

Yoon, et al., "Method for Preparing Super Absorbent Polymer." U.S. Appl. No. 18/026,495, filed Mar. 15, 2023.

Extended European Search Report for Application No. 21907139.6 dated Jan. 23, 2024. 15 pgs.

Extended European Search Report for Application No. 21907138.8 dated Jan. 11, 2024. 17 pgs.

Extended European Search Report for Application No. 21907141.2 dated Jan. 16, 2024. 21 pgs.

Catalog of "Aqua Keep" from Sumitomo Seika Chemicals, Super Absorbent Polymers, 15 pages.

Jis J., "Testing method for water absorption rate of super absorbent polymers", Japanese Standards Association, Mar. 1996, 23 pages, JIS K 7224. [providing partial English translation only].

(56) References Cited

OTHER PUBLICATIONS

Third Party of Observation for PCT/KR2021/019242 dated Apr. 16, 2023. 7 pgs.
Third Party of Observation for PCT/KR2021/019247 dated Apr. 18, 2023. 19 pgs.
Third Party of Observation for PCT/KR2021/019249 dated Apr. 17, 2023. 16 pgs.
Third Party of Observation for PCT/KR2021/019246 dated Apr. 18, 2023. 11 pgs.
Third Party of Observation for PCT/KR2021/019244 dated Apr. 16, 2023. 5 pgs.
Elvers, B. et al.,"Ullmann's Encyclopedia of Industrial Chemistry" Fifth, Completely Revised Edition, vol. A 16, Jan. 1990, pp. 361-374.
Third Party Observation for application No. 21907141.2, dated Jul. 10, 2024, pp. 1-9.
Lakritz, L. and Maerker, G., "Effect of Ionizing Radiation on Cholesterol in Aqueous Dispersion," Journal of Food Science, vol. 54, No. 6, pp. 1569-1572, Nov. 1, 1989. 4 pgs.
Qiu, Haixia et al., "Superabsorbent Polymer," School of Science, Chemistry Bulletin, Issue 09, pp. 598-604, Sep. 2003. 8 pgs.
Search Report dated Dec. 19, 2025 from the Office Action for Chinese Application No. 202180052514X issued Dec. 23, 2025, 4 pgs.

* cited by examiner

METHOD FOR PREPARING SUPER ABSORBENT POLYMER

CROSS-REFERENCE TO RELATED APPLICATIONS

This present application is a national stage entry under 35 U.S.C. § 371 of International Application No. PCT/KR2021/019244 filed on Dec. 17, 2021, which claims priority from Korean Patent Applications No. 10-2020-0178433 filed on Dec. 18, 2020 and No. 10-2021-0180293 filed on Dec. 16, 2021, all the disclosures of which are incorporated herein by reference.

TECHNICAL FIELD

The present disclosure relates to a method for preparing a super absorbent polymer. More specifically, it relates to a method for preparing a super absorbent polymer having a high surface tension and an improved absorption rate without deterioration in absorption properties, because the generated carbon dioxide bubbles can be effectively captured by performing a polymerization reaction of a monomer in the presence of an aqueous dispersion of hydrophobic particles.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products, but also for water retaining soil products for gardening, water stop materials for the civil engineering and construction, sheets for raising seedling, fresh-keeping agents for food distribution fields, materials for poultices, or the like.

These super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the pulp content is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to more efficiently absorb a large amount of liquid such as urine, it is necessary for the super absorbent polymer to exhibit high absorption performance as well as fast absorption rate.

In order to prepare the super absorbent polymer with improved absorption rate, a method of increasing a specific surface area by using a foaming agent in the polymerization step to form pores is mainly used. In particular, an encapsulated foaming agent is commonly used in terms of price and availability, and when the polymerization step is performed in the presence of such an encapsulated foaming agent, carbon dioxide bubbles are generated and the specific surface area in the cross-linked polymer increases. In addition, a bubble stabilizer is used to minimize the generated carbon dioxide bubbles from escaping out of the cross-linked polymer network. However, the use of the bubble stabilizer causes a problem in that general properties of the super absorbent polymer are deteriorated.

Accordingly, there is a continuous demand for the development of a super absorbent polymer having a fast absorption rate while maintaining centrifuge retention capacity (CRC), which is the property indicating basic absorbency and water retention capacity of the super absorbent polymer, and absorbency under pressure (AUP), which is the property of well retaining the absorbed liquid even under external pressure.

DETAILED DESCRIPTION OF THE INVENTION

Technical Problem

Accordingly, the present disclosure relates to a method for preparing a super absorbent polymer capable of preparing a super absorbent polymer having an improved absorption rate by effectively capturing bubbles generated by a foaming agent after adding an aqueous dispersion of hydrophobic particles in the polymerization step of a monomer.

Technical Solution

In order to solve the above problems, there is provided a method for preparing a super absorbent polymer including the steps of:

preparing a monomer composition containing an acrylic acid-based monomer having at least partially neutralized acidic groups and an internal cross-linking agent (step 1);

preparing a hydrogel polymer by cross-linking polymerization of the monomer composition in the presence of an aqueous dispersion of hydrophobic particles and an encapsulated foaming agent (step 2);

forming a powder-type base resin by drying and pulverizing the hydrogel polymer (step 3); and forming a surface cross-linked layer by further cross-linking the surface of the base resin in the presence of a surface cross-linking agent (step 4), wherein the aqueous dispersion of hydrophobic particles is a colloidal solution in which hydrophobic particles are dispersed by a surfactant, the hydrophobic particles contain a metal salt of a C7 to C24 fatty acid, and the encapsulated foaming agent has a structure having a core including a hydrocarbon and a shell formed of a thermoplastic resin surrounding the core.

Advantageous Effects

According to the method for preparing a super absorbent polymer of the present disclosure, when the hydrogel polymer is prepared by cross-linking polymerization of a monomer in the presence of an aqueous dispersion of hydrophobic particles and an encapsulated foaming agent, the generated carbon dioxide can be effectively captured and the specific surface area of the super absorbent polymer can be increased. Accordingly, the absorption rate of the super absorbent polymer to be prepared may be increased.

DETAILED DESCRIPTION OF THE EMBODIMENTS

The terminology used herein is for the purpose of describing particular embodiments only and is not intended to limit the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In addition, the terminologies are used merely to refer to specific embodiments, and are not intended to restrict the present disclosure. Singular expressions of the present disclosure may include plural expressions unless they are differently expressed contextually.

The terminology "polymer" in the present disclosure is in a state in which a water-soluble ethylene-based unsaturated monomer is polymerized, and may include all moisture content ranges, or all particle diameter ranges. Among the polymers, a polymer having a moisture content of about 40 wt % or more after polymerization and before drying may be referred to as a hydrogel polymer, and particles in which the hydrogel polymer is pulverized and dried may be referred to as a cross-linked polymer.

In addition, the terminology "super absorbent polymer particle" refers to a particulate material containing a cross-linked polymer in which an acrylic acid-based monomer having at least partially neutralized acidic groups is polymerized and cross-linked by an internal cross-linking agent.

In addition, the terminology "super absorbent polymer" is used to encompass all of a cross-linked polymer in which an acrylic acid-based monomer having at least partially neutralized acidic groups is polymerized or a base resin in the form of powder consisting of super absorbent polymer particles in which the cross-linked polymer is pulverized, and the cross-linked polymer or the base resin further processed, for example, surface cross-linking, fine reassembling, drying, pulverization, classification, etc., to be in a state suitable for commercialization, depending on the context. Accordingly, the terminology "super absorbent polymer" may be interpreted as including a plurality of super absorbent polymer particles.

In order to prepare a super absorbent polymer having a fast absorption rate, the specific surface area in the super absorbent polymer particles needs to be increased. As a method for increasing the specific surface area of the super absorbent polymer particles, a foaming agent is usually used. In order for the bubbles generated by the foaming agent to contribute to the increase in the surface area, they must be captured inside the polymer as soon as they are generated so as not to escape out of the cross-linked polymer. For this purpose, a foaming agent and a foam stabilizer are usually added together. An anionic surfactant, which is mainly used as the foam stabilizer, had to be used together with an excess of a foaming agent in order to effectively capture bubbles. However, when such an anionic surfactant is used in excess, the surface tension of the super absorbent polymer is lowered, pores in the super absorbent polymer are not formed uniformly and evenly, and a large amount of fines are generated during manufacture and transport.

Accordingly, the present inventors have found that in the case of using an aqueous dispersion containing hydrophobic particles as a foam stabilizer in addition to the conventional foam stabilizer such as an anionic surfactant to prepare a super absorbent polymer, it effectively generates and captures bubbles by acting as a seed when the bubbles are generated by the foaming agent, and the small and uniformly shaped bubbles can be uniformly distributed over the entire area of the cross-linked polymer, thereby completing the present invention.

In particular, the method for preparing a super absorbent polymer is characterized in that the hydrophobic particles are not used in the form of a powder, but are added to the monomer composition in the form of an aqueous dispersion. In other words, the hydrophobic particles are introduced into the monomer composition in the form of "aqueous dispersion of hydrophobic particles", that is, in the form of a colloidal solution in which the hydrophobic particles are stably dispersed without being precipitated or agglomerated by the surfactant. This is because, when the polymerization process is performed by introducing the hydrophobic particles into the monomer composition in the form of a powder, the hydrophobic particles are not dispersed in the monomer composition in the form of an aqueous solution, so that the bubbles generated by the foaming agent cannot be effectively stabilized.

In addition, the hydrophobic particles are stably dispersed in the aqueous dispersion by the surfactant without agglomeration between particles. Specifically, the surfactant may form an electric double layer on the surface of hydrophobic particles to induce an electrostatic repulsive force between particles, which may stabilize the hydrophobic particles, or the surfactant may be adsorbed on the surface of hydrophobic particles to induce a steric repulsive force between particles, which may prevent the particles from agglomerating with each other. Therefore, when a surfactant is not included in the aqueous dispersion of hydrophobic particles, a phenomenon in which the hydrophobic particles agglomerate with each other or sink due to gravity is caused, so that dispersion of the hydrophobic particles cannot be stabilized. Accordingly, even when an aqueous dispersion of hydrophobic particles that does not contain a surfactant is used together with a foaming agent in the polymerization step, it is impossible to effectively capture bubbles and thus pores having a uniform size cannot be formed in the super absorbent polymer, so it is difficult to improve the absorption rate of the super absorbent polymer.

Moreover, when an epoxy-based compound is used as an internal cross-linking agent in the preparation of the super absorbent polymer, the gelation time is slower than the case of using an acrylate-based compound as an internal cross-linking agent. Accordingly, there has been a problem in that the bubbles generated by the foaming agent before the cross-linked structure is formed are blown away, and thus the gas cannot be effectively captured. Therefore, in order to increase the specific surface area of the super absorbent polymer prepared by using an epoxy-based compound as an internal cross-linking agent, an excessive amount of the foaming agent has to be used. However, when the aqueous dispersion of hydrophobic particles is used together with a foaming agent, even if only a small amount of the foaming agent is used, the hydrophobic particles function as a seed to effectively generate and capture bubbles. Thus, it is possible to form a desired pore structure without the use of an excessive amount of the foaming agent.

In addition, the super absorbent polymer prepared according to one embodiment has a vortex time at 24.0° C. of 35 seconds or less, and one-minute tap water absorbency, which is defined as a weight of water absorbed in the super absorbent polymer in 1 minute when 1 g of the super absorbent polymer is immersed in 2 L of tap water and swollen for 1 minute, of 115 g/g or more.

Hereinafter, each step of the method for preparing a super absorbent polymer according to a specific embodiment of the present disclosure will be described in more detail.

(Step 1)

In the preparation method according to one embodiment, step 1 is a step of preparing a monomer composition containing an acrylic acid-based monomer having at least partially neutralized acidic groups and an internal cross-linking agent.

The acrylic acid-based monomer is a compound represented by the following Chemical Formula 1:

$$R^1—COOM^1 \qquad \text{[Chemical Formula 1]}$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer may include at least one selected from the group consisting of acrylic acid, methacrylic acid, and a monovalent metal salt, a divalent metal salt, an ammonium salt and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 mol %, or 45 to 75 mol %. The range of the degree of neutralization can be adjusted according to final properties. An excessively high degree of neutralization causes the neutralized monomers to be precipitated, and thus polymerization may not readily occur. On the contrary, an excessively low degree of neutralization not only deteriorates absorbency of the polymer, but also gives the polymer hard-to-handle properties, such as those of an elastic rubber.

In addition, a concentration of the acrylic acid-based monomer may be about 20 to 60 wt %, or about 40 to 50 wt % based on the monomer composition containing the raw materials of the super absorbent polymer and the solvent, and properly controlled in consideration of polymerization time and reaction conditions. When the concentration of the monomer is excessively low, the yield of the super absorbent polymer is low and there may be a problem in economic efficiency. In contrast, when the concentration is excessively high, it may cause problems in processes in that some of the monomer may be extracted or the pulverization efficiency of the polymerized hydrogel polymer may be lowered in the pulverization process, and thus physical properties of the super absorbent polymer may be deteriorated.

In addition, the terminology 'internal cross-linking agent' used herein is different from a surface cross-linking agent for cross-linking the surface of the super absorbent polymer particles to be described later, and the internal cross-linking agent polymerizes unsaturated bonds of the water-soluble ethylene-based unsaturated monomers by cross-linking. The cross-linking in the above step proceeds both on the surface and on the inside, but when the surface cross-linking process of the super absorbent polymer particles to be described later is in progress, the surface of the particles of the finally prepared super absorbent polymer has a structure cross-linked by a surface cross-linking agent, and the inside of the particles has a structure cross-linked by the internal cross-linking agent.

As the internal cross-linking agent, any compound may be used as long as it allows the introduction of cross-linking bonds during polymerization of the acrylic acid-based monomer. Specifically, the internal cross-linking agent may be a cross-linking agent having one or more ethylene-based unsaturated groups in addition to the functional group which may react with the water-soluble substituents of the acrylic acid-based monomer; or a cross-linking agent having two or more functional groups which may react with the water-soluble substituents of the monomer and/or the water-soluble substituents formed by hydrolysis of the monomer.

For example, as the internal cross-linking agent, a multifunctional cross-linking agent may be used alone or in combination of two or more. Specifically, examples of the internal cross-linking agent include an acrylate-based compound such as N,N'-methylenebisacrylamide, trimethylpropane tri(meth)acrylate, ethylene glycol di(meth)acrylate, polyethylene glycol (meth)acrylate, polyethylene glycol di(meth)acrylate, propylene glycol di(meth)acrylate, polypropylene glycol (meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, and pentaerythritol tetraacrylate; an epoxy-based compound such as ethylene glycol diglycidyl ether, diethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, polytetramethylene glycol diglycidyl ether, glycerol diglycidyl ether, glycerol triglycidyl ether, diglycerol polyglycidyl ether and polyglycerol polyglycidyl ether; triarylamine; propylene glycol; glycerin; and ethylene carbonate, but the present disclosure is not limited thereto.

According to one embodiment, the epoxy-based compound may be used as the internal cross-linking agent. For example, as the internal cross-linking agent, a polyvalent epoxy compound of divalent or higher such as ethylene glycol diglycidyl ether may be used. In this case, foaming by the foaming agent may be stably performed by the hydrophobic particles.

In the monomer composition, the internal cross-linking agent may be used in an amount of 0.01 to 5 parts by weight based on 100 parts by weight of the acrylic acid-based monomer. For example, the internal cross-linking agent may be used in an amount of 0.01 parts by weight or more, 0.05 parts by weight or more, 0.1 parts by weight or more, or 0.15 parts by weight or more, and 5 parts by weight or less, 3 parts by weight or less, 2 parts by weight or less, 1 parts by weight or less, or 0.7 parts by weight or less based on 100 parts by weight of the water-soluble ethylene-based unsaturated monomer. When too little internal cross-linking agent is used, cross-linking does not occur sufficiently, and thus it may be difficult to achieve strength above an appropriate level, and when too much internal cross-linking agent is used, the internal cross-linking density increases, and thus it may be difficult to achieve a desired level of water retention capacity.

In addition, the monomer composition may further include a polymerization initiator for initiating a polymerization reaction of the monomer. The polymerization initiator is not particularly limited as long as it is generally used in the preparation of super absorbent polymers.

Specifically, the polymerization initiator may be an initiator for thermal polymerization or an initiator for photopolymerization by UV radiation according to the polymerization method. However, even when the photopolymerization method is applied thereto, a certain amount heat is generated by UV radiation and the like, and some heat occurs as the polymerization reaction, an exothermal reaction, progresses. Therefore, the composition may additionally include the thermal polymerization initiator.

More specifically, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO, namely, diphenyl(2,4,6-trimethylbenzoyl)phosphine oxide, may be used. More various photopolymerization initiators are well disclosed in "UV Coatings: Basics, Recent Developments and New Application (Elsevier, 2007)" written by Reinhold Schwalm, p 115, and the present disclosure is not limited thereto.

The photopolymerization initiator may be used at a concentration of about 0.01 to about 1.0 wt % based on the monomer composition. When the concentration of the photopolymerization initiator is excessively low, the polymerization rate may become slow, and when the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4)_2S_2O_8$), and the like may be used as examples of the persulfate-based initiators; and 2,2-azobis-(2-amidinopropane)dihydrochloride, 2,2-azobis-(N,N-dimethylene)isobutyramidinedihydrochloride, 2-(carbamoylazo)isobutylonitril, 2,2-azobis-[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

The thermal polymerization initiator may be used at a concentration of about 0.001 to about 0.5 wt % based on the monomer composition. When the concentration of the thermal polymerization initiator is excessively low, additional thermal polymerization hardly occurs and there may be less effect of adding the thermal polymerization initiator. When the concentration of the thermal polymerization initiator is excessively high, the molecular weight of the super absorbent polymer may become low and the properties may be uneven.

The polymerization initiator may be used in an amount of 2 parts by weight or less based on 100 parts by weight of the water-soluble ethylene-based unsaturated monomer. When the concentration of the polymerization initiator is excessively low, the polymerization rate may become slow, and a large amount of residual monomers may be extracted from the final product. Conversely, when the concentration of the polymerization initiator is higher than the above range, polymer chains forming a network are shortened, so that the content of extractable components increases and absorbency under pressure decreases, thereby lowering physical properties of the polymer.

The monomer composition may further include an additive such as a thickener, a plasticizer, a preservation stabilizer, and an antioxidant, if necessary.

In addition, the monomer composition containing the monomer may be, for example, in the form of a solution dissolved in a solvent such as water. The solid content of the monomer composition in a solution state, that is, the concentration of the monomer, the internal cross-linking agent, and the polymerization initiator may be appropriately adjusted in consideration of the polymerization time and reaction conditions. For example, the solid content of the monomer composition may be 10 to 80 wt %, 15 to 60 wt %, or 30 to 50 wt %.

When the monomer composition has the solid content in the above range, it may be advantageous for controlling the pulverization efficiency during pulverization of the polymer to be described later while eliminating the need to remove unreacted monomers after polymerization by using a gel effect phenomenon occurring in the polymerization reaction of a high-concentration aqueous solution.

At this time, any solvent which can dissolve the above components may be used without limitation. For example, the solvent may be at least one selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, or N,N-dimethylacetamide.

(Step 2)

Subsequently, a step of preparing a hydrogel polymer by cross-linking polymerization of the monomer composition in the presence of an aqueous dispersion of hydrophobic particles and an encapsulated foaming agent is performed. As the capsule of the encapsulated foaming agent bursts in the above step, bubbles are generated by the hydrocarbon gas in the capsule, and the hydrophobic particles dispersed in water effectively capture these bubbles, thereby increasing the specific surface area of the prepared hydrogel polymer.

The hydrophobic particles contain a metal salt of a C7 to C24 fatty acid. Herein, the metal salt of a C7 to C24 fatty acid refers to a compound in which a metal cation is bonded instead of a hydrogen ion of a carboxyl group at the end of an unsaturated or saturated fatty acid having a linear structure while having 7 to 24 carbon atoms in the molecule, and may be a monovalent metal salt, or a polyvalent metal salt of divalent or higher. At this time, when the hydrophobic particles are a metal salt of a fatty acid having less than 7 carbon atoms, it is not possible to capture the bubbles generated in the form of particles by ionization in an aqueous solution. When the hydrophobic particles are a metal salt of a fatty acid having more than 24 carbon atoms, the chain of the fatty acid becomes long, which may cause difficult dispersion.

Specifically, when the metal salt of the fatty acid is a monovalent metal salt, it has a structure in which one fatty acid carboxylate anion is bonded to an alkali ion, which is a monovalent metal cation. In addition, when the metal salt of the fatty acid is a polyvalent metal salt of divalent or higher, it has a structure in which as many as fatty acid carboxylate anions as the number of the valence of the metal cation are bonded to the metal cation.

In one embodiment, the hydrophobic particles may be a metal salt of a C12 to C20 saturated fatty acid. For example, the hydrophobic particles may be at least one metal salt of a saturated fatty acid selected from the group consisting of a metal salt of lauric acid containing 12 carbon atoms in the molecule; a metal salt of tridecyl acid containing 13 carbon atoms in the molecule; a metal salt of myristic acid containing 14 carbon atoms in the molecule; a metal salt of pentadecanoic acid containing 15 carbon atoms in the molecule; a metal salt of palmitic acid containing 16 carbon atoms in the molecule; a metal salt of margaric acid containing 17 carbon atoms in the molecule; a metal salt of stearic acid containing 18 carbon atoms in the molecule; a metal salt of nonadecylic acid containing 19 carbon atoms in the molecule; and a metal salt of arachidic acid containing 20 carbon atoms in the molecule.

Preferably, the hydrophobic particles may be a metal salt of stearic acid. For example, the hydrophobic particles may be at least one metal salt of stearic acid selected from the group consisting of calcium stearate, magnesium stearate, sodium stearate, zinc stearate and potassium stearate.

In addition, as described above, the hydrophobic particles dispersed in the aqueous dispersion may have an average particle diameter of 0.5 μm to 20 μm. When the hydrophobic particles have an average particle diameter of less than 0.5 μm, there is a problem in that it is difficult to effectively capture the generated bubbles, so that uniform pores cannot be formed. When the hydrophobic particles have an average particle diameter of more than 20 μm, the pore size to be formed becomes excessively large, so it may be difficult to improve the absorption rate of the super absorbent polymer. Specifically, the hydrophobic particles may have an average particle diameter (μm) of 0.5 or more, 1 or more, 2 or more, or 3 or more, and 20 or less, 15 or less, or 10 or less.

Herein, the average particle diameter of the hydrophobic particles means D50, and the "particle diameter Dn" means a particle diameter at the n % point of the cumulative distribution of the number of particles according to particle diameters. In other words, D50 is a particle diameter at the 50% point of the cumulative distribution of the number of particles according to particle diameters, D90 is a particle diameter at the 90% point of the cumulative distribution of the number of particles according to particle diameters, and D10 is a particle diameter at the 10% point of the cumulative distribution of the number of particles according to particle diameters. The Dn may be measured using a laser diffraction method. Specifically, the powder to be measured is dispersed in the dispersion medium and introduced into a commercially available particle size measuring device (e.g., Microtrac S3500). Then, a particle size distribution is obtained by measuring a difference in diffraction patterns according to particle diameters when the particles pass through the laser beam. In the measuring device, D10, D50 and D90 can be obtained by calculating a particle diameter at a point of reaching 10%, 50% and 90% of the cumulative distribution of the number of particles according to particle diameters.

In addition, the hydrophobic particles may be included in the aqueous dispersion in an amount of 10 to 70 wt % based on a total weight of the aqueous dispersion. When the content of the hydrophobic particles in the hydrophobic aqueous dispersion is too low or too high, dispersion stabilization of the hydrophobic particles cannot be achieved, and a problem of agglomeration between particles or sinkage by gravity may occur.

In addition, as the surfactant for dispersing the hydrophobic particles in the aqueous dispersion of hydrophobic particles, a surfactant known in the art that can stabilize the dispersion of the hydrophobic particles may be used without limitation. For example, one or more surfactants selected from the group consisting of cationic surfactants, anionic surfactants, amphoteric surfactants and nonionic surfactants may be used as the surfactant. Preferably, two or more surfactants may be used for dispersion stabilization of the hydrophobic particles. More specifically, in consideration of the form of the hydrophobic particles, for example, the form of a metal salt of a saturated fatty acid, a nonionic surfactant and an anionic surfactant may be used together in order to more effectively disperse the hydrophobic particles in water. For example, a nonionic surfactant to which a long-chain hydrocarbon having 10 or more carbon atoms is bonded and a sulfate-based anionic surfactant may be used together.

For example, examples of the cationic surfactant include dialkyldimethylammonium salt and alkylbenzylmethylammonium salt, examples of the anionic surfactant include alkylpolyoxyethylene sulfate, monoalkyl sulfate, alkylbenzene sulfonate, monoalkyl phosphate, a sulfate having a functional group containing a long-chain hydrocarbon or a salt thereof such as sodium lauryl ether sulfate, ammonium lauryl sulfate, sodium dodecyl sulfate, sodium myreth sulfate, or sodium laureth sulfate, examples of the amphoteric surfactant include alkylsulfobetaine and alkylcarboxybetaine, and examples of the nonionic surfactant include polyoxyethylene alkyl ether such as polyethylene glycol or polyoxyethylene lauryl ether, polyoxyalkylene alkylphenyl ether, polyoxyethylene arylphenyl ether, fatty acid ester such as polysorbate, fatty acid sorbitan ester, or glycerin monostearate, alkyl monoglyceryl ether, alkanolamide, and alkyl polyglycoside. However, the present disclosure is not limited thereto.

In addition, the aqueous dispersion of hydrophobic particles may have a pH of 7 or more. When the pH of the aqueous dispersion of hydrophobic particles is less than 7, it is acidic, so it is difficult to stabilize the hydrophobic particles, which are metal salts of fatty acids, which is not suitable.

Meanwhile, the hydrophobic particles may be used in an amount of 0.005 to 0.4 parts by weight based on 100 parts by weight of the acrylic acid-based monomer. When the content of the hydrophobic particles is too low, the bubbles may not be sufficiently captured, and thus the absorption rate may be slowed. When the content of the hydrophobic particles is too high, the amount of the surfactant used to stabilize the hydrophobic particles in the aqueous dispersion of the hydrophobic particles increases, so that the surface tension may be lowered. For example, the hydrophobic particles may be used in an amount of 0.01 parts by weight or more, 0.03 parts by weight or more, 0.05 parts by weight or more, or 0.1 parts by weight or more, and 0.35 parts by weight or less, 0.3 parts by weight or less, 0.25 parts by weight or less, or 0.2 parts by weight or less based on 100 parts by weight of the acrylic acid-based monomer.

In addition, the encapsulated foaming agent refers to a thermally expandable microcapsule foaming agent having a core-shell structure, and the core-shell structure has a core including a hydrocarbon and a shell formed of a thermoplastic resin on the core. Specifically, the hydrocarbon constituting the core is a liquid hydrocarbon having a low boiling point and is easily vaporized by heat. Therefore, when heat is applied to the encapsulated foaming agent, the thermoplastic resin constituting the shell is softened and the liquid hydrocarbon of the core is vaporized at the same time. In addition, as the pressure inside the capsule increases, the encapsulated foaming agent expands, and accordingly, bubbles having an increased size than the existing size are formed.

Accordingly, the encapsulated foaming agent generates hydrocarbon gas, and is distinguished from an organic foaming agent that generates nitrogen gas through an exothermic decomposition reaction between monomers participating in the production of a polymer, and an inorganic foaming agent that foams carbon dioxide gas by absorbing heat generated in the production of a polymer.

The encapsulated foaming agent may have different expansion characteristics depending on the components constituting the core and the shell, and the weight and diameter of each component. Therefore, the encapsulated foaming agent can be expanded to a desired size by adjusting them, thereby controlling the porosity of the super absorbent polymer.

Specifically, the encapsulated foaming agent has a particle shape having an average diameter ($D_0$) of 5 to 30 µm before expansion. It is difficult to manufacture the encapsulated foaming agent to have an average diameter of less than 5 µm. When the average diameter of the encapsulated foaming agent exceeds 30 µm, it may be difficult to efficiently increase the surface area because the size of pores is too large. Therefore, when the encapsulated foaming agent has the average diameter as described above, it can be determined that the encapsulated foaming agent is suitable for achieving an appropriate pore structure in the resin.

For example, the average diameter before expansion of the encapsulated foaming agent may be 5 µm or more, 6 µm or more, 7 µm or more, 8 µm or more, or 10 µm or more, and 30 µm or less, 25 µm or less, 20 µm or less, 17 µm or less, 16 µm or less, or 15 µm or less.

The average diameter ($D_0$) of the encapsulated foaming agent before expansion can be measured by measuring the diameter of each encapsulated foaming agent particle as an average Feret diameter with an optical microscope, and then obtaining an average value thereof.

In this case, a capsule thickness of the encapsulated foaming agent may be 2 to 15 µm.

In addition, the encapsulated foaming agent has a maximum expansion size in air of 20 to 190 µm. Herein, the "maximum expansion size of the encapsulated foaming agent" means a diameter range of the top 10 wt % of the highly expanded particles after applying heat to the encapsulated foaming agent. It is difficult to manufacture the encapsulated foaming agent such that the maximum expansion size in air is smaller than 20 µm, and when the maximum expansion size in air exceeds 190 µm, it may be difficult to efficiently increase the surface area because the size of pores is too large.

For example, the encapsulated foaming agent may have a maximum expansion size in air of 50 to 190 µm, 70 to 190 µm, 75 to 190 µm, or 80 to 150 µm.

The maximum expansion size in air of the encapsulated foaming agent may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of the top 10 wt % of the highly expanded particles as an average Feret diameter with an optical microscope.

In addition, the encapsulated foaming agent has a maximum expansion ratio in air of 5 to 15 times. Herein, the "maximum expansion ratio of the encapsulated foaming agent" means a ratio ($D_M/D_0$) of the average diameter ($D_M$) of the top 10 wt % of the highly expanded particles after applying heat to the average diameter ($D_0$) of the encapsulated foaming agent measured before applying heat. When the maximum expansion ratio in air of the encapsulated foaming agent is less than 5 times, an appropriate pore structure cannot be formed in the super absorbent polymer, so there is a problem in that it is impossible to manufacture a super absorbent polymer with improved absorbency and absorption rate. It is difficult to manufacture the encapsulated foaming agent such that the maximum expansion ratio in air exceeds 15 times, considering the average diameter of the encapsulated foaming agent before expansion. Therefore, it can be determined that the encapsulated foaming agent having the maximum expansion ratio within the above range is suitable for forming a pore structure suitable for the super absorbent polymer.

For example, the maximum expansion ratio in air of the encapsulated foaming agent may be 5 times or more, 7 times or more, or 8 times or more, and 15 times or less, 13 times or less, 11 times or less, or 10 times or less.

At this time, the average diameter ($D_0$) of the encapsulated foaming agent measured before applying heat may be measured as described above. In addition, the average diameter ($D_M$) of the top 10 wt % of the highly expanded particles after applying heat may be determined by applying 0.2 g of the encapsulated foaming agent on a glass Petri dish and leaving it on a hot plate preheated to 150° C. for 10 minutes, and then observing the expanded encapsulated foaming agent with an optical microscope. Then, it may be obtained by measuring the diameter of each of the top 10 wt % of the particles as an average Feret diameter with an optical microscope, and then obtaining an average value thereof.

The expansion characteristics of the encapsulated foaming agent may be further specified in Examples to be described later.

The reason for measuring the maximum expansion size and the maximum expansion ratio of the encapsulated foaming agent in air is to determine whether pores having a desired size are formed in the super absorbent polymer to be prepared using the encapsulated foaming agent. Specifically, the shape in which the foaming agent is foamed may vary depending on the preparation conditions of the super absorbent polymer, so it is difficult to define the foamed shape. Therefore, the expansion size and the expansion ratio are determined by first foaming the encapsulated foaming agent in air, and confirming whether the encapsulated foaming agent is suitable for forming the desired pores.

And, the hydrocarbon constituting the core of the encapsulated foaming agent may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane. Among them, the C3 to C5 hydrocarbons (n-propane, n-butane, iso-butane, cyclobutane, n-pentane, iso-pentane, cyclopentane) are suitable for forming pores having the above-mentioned size, and iso-butane may be most suitable.

In addition, the thermoplastic resin constituting the shell of the encapsulated foaming agent may be a polymer formed from at least one monomer selected from the group consisting of (meth)acrylate-based compounds, (meth)acrylonitrile-based compounds, aromatic vinyl compounds, vinyl acetate compounds, and halogenated vinyl compounds. Among them, a copolymer of (meth)acrylate and (meth) acrylonitrile may be most suitable for forming pores having the above-mentioned size.

In addition, the foaming start temperature ($T_{start}$) of the encapsulated foaming agent may be 60° C. to 120° C., 65° C. to 120° C., or 70° C. to 80° C., and the maximum foaming temperature ($T_{max}$) may be 100° C. to 160° C., 105° C. to 155° C., or 110° C. to 120° C. Within the above range, foaming may occur easily in a subsequent thermal polymerization process or drying process to introduce a pore structure in the polymer. The foaming start temperature and the foaming maximum temperature can be measured using a thermomechanical analyzer.

In addition, the encapsulated foaming agent may be used in an amount of 0.005 to 1 part by weight based on 100 parts by weight of the acrylic acid-based monomer. When the content of the foaming agent is less than 0.005 parts by weight, the effect of adding the foaming agent may be insignificant. When the content of the foaming agent exceeds 1 part by weight, there are too many pores in the cross-linked polymer, so that gel strength of the super absorbent polymer to be prepared decreases and the density also decreases, which may cause problems in distribution and storage. For example, the encapsulated foaming agent may be used in an amount of 0.01 parts by weight or more, 0.03 parts by weight or more, or 0.05 parts by weight or more, and 0.8 parts by weight or less, 0.6 parts by weight or less, or 0.5 parts by weight or less based on 100 parts by weight of the acrylic acid-based monomer.

In addition, the encapsulated foaming agent and the hydrophobic particles may be used in a weight ratio of 1:0.1 to 1:3.5. When the hydrophobic particles are used in an excessively low content compared to the encapsulated foaming agent, it is difficult to effectively capture the generated bubbles. When the hydrophobic particles are used in an excessively high content compared to the foaming agent, various physical properties such as water retention capacity and absorption rate may decrease. For example, the hydrophobic particles may be used in a weight ratio of 0.1 times or more, 0.2 times or more, or 0.3 times or more, and 3.5 times or less, 3.0 times or less, 2.5 times or less, 2.0 times or less, or 1.5 times or less relative to the weight of the encapsulated foaming agent.

In addition, a surfactant commonly used as a foam stabilizer may be further added together with the encapsulated foaming agent and the aqueous dispersion of hydrophobic particles in the step 2. Herein, the usable surfactant may be cationic surfactants such as quaternary ammonium compounds, e.g., dodecyltrimethylammonium chloride, or dodecyltrimethylammonium bromide; anionic surfactants such as alkyl sulfate-based compounds, e.g., sodium dodecyl sulfate, ammonium lauryl sulfate, sodium lauryl ether sulfate, or sodium myreth sulfate; or nonionic surfactants such as alkyl ether sulfate-based compounds, e.g., polyoxyethylene lauryl ether, but is not limited thereto.

More specifically, at least one foam stabilizer selected from the group consisting of an alkyl sulfate-based compound and a polyoxyethylene alkyl ether-based compound may be further added in the step 2 together with an encapsulated foaming agent and the aqueous dispersion of hydrophobic particles. When the foam stabilizer is further added, dispersibility of the encapsulated foaming agent and the aqueous dispersion of hydrophobic particles is improved, so that the generation and capture of bubbles can occur uniformly, and the absorption rate of the prepared super absorbent polymer can be increased.

In this case, the encapsulated foaming agent and the foam stabilizer may be used in a weight ratio of 1:0.01 to 1:0.5. However, when the foam stabilizer is used too much, it may coat the base resin or the surface of the super absorbent polymer, thereby reducing processability and reducing absorption-related physical properties of the super absorbent polymer, which is not preferable. For example, the foam stabilizer may be used in a weight ratio of 0.015 times or more, 0.02 times or more, or 0.05 times or more, and 0.4 times or less, 0.35 times or less, or 0.3 times or less relative to the weight of the encapsulated foaming agent.

Meanwhile, the polymerization of the monomer composition in the presence of such an aqueous dispersion of hydrophobic particles and an encapsulated foaming agent is not particularly limited as long as it is a commonly used polymerization method.

Specifically, the polymerization method is largely divided into the thermal polymerization and the photopolymerization according to an energy source of the polymerization. In the case of thermal polymerization, it is generally carried out in a reactor equipped with an agitation spindle, such as a kneader. In the case of photopolymerization, it may be carried out in a reactor equipped with a movable conveyor belt. However, the polymerization method is just an example, and the present disclosure is not limited thereto.

For example, in the reactor equipped with an agitation spindle such as a kneader, the hydrogel polymer obtained by thermal polymerization by supplying hot air or heating the reactor may be discharged to a reactor outlet in the form of several centimeters to several millimeters depending on a shape of the agitation spindle provided in the reactor. Specifically, a size of the hydrogel polymer obtained may vary depending on the concentration and injection rate of the monomer composition to be injected, and a hydrogel polymer having a weight average particle diameter of 2 to 50 mm may be usually obtained.

In addition, when photopolymerization is performed in the reactor equipped with a movable conveyor belt as described above, a hydrogel polymer in the form of a sheet having a belt width may usually be obtained. At this time, a thickness of the polymer sheet may vary depending on the concentration and injection rate of the monomer composition to be injected, and it is preferable to supply the monomer composition so that the polymer in the form of a sheet has a thickness of about 0.5 to about 5 cm. When the monomer composition is supplied to such an extent that the thickness of the polymer sheet is too thin, the production efficiency may be low. When the thickness of the polymer sheet exceeds 5 cm, the polymerization reaction may not occur evenly over the entire thickness due to the excessively thick thickness.

Generally, the moisture content of the hydrogel polymer obtained by the above method may be about 40 to about 80 wt %. At this time, "moisture content" in the present disclosure is the content of moisture in the entire weight of the polymer, and it means a value of which the weight of the dried polymer is subtracted from the weight of the polymer. Specifically, the moisture content is defined as a value calculated by measuring the weight loss due to moisture evaporation from the polymer in the process of increasing the temperature of the polymer for drying through infrared heating. At this time, the drying condition for measuring the moisture content is as follows: the temperature is increased to about 180° C. and maintained at 180° C., and the total drying time is 20 minutes including 5 minutes of a heating step.

(Step 3)

Subsequently, a step of drying and pulverizing the hydrogel polymer to form a powder-type base resin is performed. If necessary, a coarse pulverization step may be further performed before drying to increase the efficiency of the drying step.

Herein, the pulverizing machine used is not particularly limited. Specifically, it may include at least one selected from the group consisting of a vertical pulverizer, a turbo cutter, a turbo grinder, a rotary cutter mill, a cutter mill, a disc mill, a shred crusher, a crusher, a chopper, and a disc cutter, but it is not limited thereto.

In the pulverization step, the polymer may be pulverized to have a diameter of about 2 to about 10 mm.

It is technically difficult to pulverize the hydrogel polymer to have a diameter of less than 2 mm because of its high moisture content, and there may be a phenomenon that the pulverized particles cohere with each other. Meanwhile, when the polymer is pulverized to have a diameter of larger than 10 mm, the efficiency enhancing effect in the subsequent drying step may be insignificant.

The drying is performed on the pulverized polymer as described above or on the polymer immediately after polymerization without the pulverization step. The drying temperature in the drying step may be about 150 to about 250° C. When the drying temperature is less than 150° C., the drying time may become excessively long and physical properties of the super absorbent polymer to be finally formed may decrease. When the drying temperature is more than 250° C., only the surface of the polymer is excessively dried, fine powder may be generated in the subsequent pulverization process, and physical properties of the final super absorbent polymer may decrease. Therefore, the drying may preferably be performed at a temperature of about 150 to about 200° C., more preferably at a temperature of about 160 to about 180° C.

Meanwhile, the drying time may be about 20 minutes to about 90 minutes in consideration of process efficiency, but is not limited thereto.

The drying method in the drying step is not particularly limited if it has been generally used in the drying process of the hydrogel polymer. Specifically, the drying step may be performed by the method of hot air provision, infrared radiation, microwave radiation, UV ray radiation, and the like. After the drying step, the moisture content of the polymer may be about 5 to about 10 wt %.

Subsequently, a step of pulverizing the dried polymer obtained through the drying step is performed.

The base resin, which is a polymer powder obtained after the pulverization step, may have a particle diameter of about 150 to about 850 μm. As the pulverizing machine used for pulverization to such a particle diameter, a pin mill, a hammer mill, a screw mill, a roll mill, a disc mill, a jog mill, or the like may be used, but the present disclosure is not limited thereto.

In order to manage the physical properties of the super absorbent polymer powder to be commercialized after the pulverization step, the base resin obtained after pulverization is classified according to particle size. Preferably, the polymer having a particle diameter of about 150 to about 850 μm is classified, and only the base resin having such a particle diameter may be subjected to a surface cross-linking reaction step. In this case, the particle diameter may be measured in accordance with the EDANA (European Disposables and Nonwovens Association) WSP 220.3.

(Step 4)

Subsequently, a step of forming a surface cross-linked layer by further cross-linking the surface of the base resin in the presence of a surface cross-linking agent is performed. By the above step, there is provided a super absorbent polymer in which a surface cross-linked layer is formed on the surface of the base resin, more specifically, on at least a part of the surface of each of the super absorbent polymer particles.

The surface cross-linking is a step of increasing a cross-linking density near the surface of super absorbent polymer particles with regard to a cross-linking density inside the particles. Generally, surface cross-linking agents are applied on the surface of super absorbent polymer particles. Therefore, surface cross-linking reactions occur on the surface of the super absorbent polymer particles, which improves cross-linkability on the surface of the particles without substantially affecting the inside of the particles. Thus, the surface cross-linked super absorbent polymer particles have a higher degree of cross-linking at the surface than inside.

As the surface cross-linking agent, any surface cross-linking agent that has been conventionally used in the preparation of a super absorbent polymer may be used without any particular limitation. Examples of the surface cross-linking agent may include at least one polyol selected from the group consisting of ethylene glycol, propylene glycol, 1,3-propanediol, 1,4-butanediol, 1,6-hexanediol, 1,2-hexanediol, 1,3-hexanediol, 2-methyl-1,3-propanediol, 2,5-hexanediol, 2-methyl-1,3-pentanediol, 2-methyl-2,4-pentanediol, tripropylene glycol and glycerol; at least one carbonate-based compound selected from the group consisting of ethylene carbonate, propylene carbonate, and glycerol carbonate; an epoxy compound such as ethylene glycol diglycidyl ether; an oxazoline compound such as oxazolidinone; a polyamine compound; an oxazoline compound; a mono-, di- or poly-oxazolidinone compound; a cyclic urea compound; and the like.

According to one embodiment, the surface cross-linking agent may be the same as the internal cross-linking agent. For example, the surface cross-linking agent may include a polyvalent epoxy compound of divalent or higher such as ethylene glycol diglycidyl ether. Alternatively, only ethylene glycol diglycidyl ether may be used as the surface cross-linking agent. The ethylene glycol diglycidyl ether has high water solubility and has two epoxy groups, so that the surface reaction can easily proceed even at a relatively low temperature.

The content of the surface cross-linking agent may be appropriately selected depending on the type of the added surface cross-linking agent or reaction conditions. For example, it may be used in an amount of about 0.001 to about 5 parts by weight, preferably about 0.01 to about 3 parts by weight parts, and more preferably about 0.05 to about 2 parts by weight based on 100 parts by weight of the base resin. When the content of the surface cross-linking agent is too small, the surface cross-linking reaction hardly occurs, and when it exceeds 5 parts by weight based on 100 parts by weight of the base resin, absorption properties such as water retention capacity may be deteriorated due to excessive surface cross-linking reaction.

In addition, the method of mixing the surface cross-linking agent with the base resin powder is not particularly limited. For example, a method of adding the surface cross-linking agent and the base resin powder in a reactor for mixing, a method of spraying the surface cross-linking agent onto the base resin powder, or a method of mixing the base resin powder and the surface cross-linking agent while continuously providing them to a continuously operating mixer may be used.

When adding the surface cross-linking agent, water may be mixed together and added in the form of a surface cross-linking solution. When water is added thereto, there is an advantage that the surface cross-linking agent may be evenly dispersed in the polymer. At this time, amounts of water to be added may be properly controlled for the purposes of inducing a uniform dispersion of the surface cross-linking agent, preventing an agglomeration phenomenon of the polymer powder, and optimizing a surface penetration depth of the surface cross-linking agent. For example, water may preferably be added in an amount of about 1 to about 10 parts by weight based on 100 parts by weight of the base resin.

According to one embodiment of the present disclosure, propylene glycol or propylene carbonate is included as a solvent in addition to water. Moreover, alcohol-based solvents, such as methanol, are not included.

The propylene glycol or propylene carbonate does not participate in the surface cross-linking reaction and functions as a solvent. Accordingly, the surface cross-linking solution is slowly absorbed into the base resin, thereby enabling uniform application. Alcohol-based solvents such as methanol, which are generally used as a solvent for a surface cross-linking solution, have a disadvantage of causing a bad odor. However, according to one embodiment of the present disclosure, the above effects can be achieved without a characteristic odor by including propylene glycol or propylene carbonate as a solvent of the surface cross-linking solution and excluding an alcohol-based solvent.

In addition, it has been confirmed that when propylene glycol or propylene carbonate is included as a solvent instead of the alcohol-based solvent, a rewet phenomenon can be improved while both the water retention capacity and the absorbency under pressure are maintained at high levels.

At this time, amounts of propylene glycol or propylene carbonate to be added may be properly controlled for the purposes of inducing a uniform dispersion of the surface cross-linking agent, preventing an agglomeration phenomenon of the polymer powder, and optimizing a surface penetration depth of the surface cross-linking agent. For example, propylene glycol or propylene carbonate may preferably be added in an amount of about 0.1 parts by weight or more, about 0.2 parts by weight or more, or about 0.3 parts by weight or more, and about 5 parts by weight or less, about 4 parts by weight or less, or 3 parts by weight or less based on 100 parts by weight of the base resin.

The surface cross-linking reaction is performed by heating the base resin to which the surface cross-linking solution containing the surface cross-linking agent and the solvent is added at a temperature of about 100 to about 150° C., preferably about 110 to about 140° C. for about 15 to about 80 minutes, preferably about 20 to about 70 minutes. When the cross-linking reaction temperature is less than 100° C., the surface cross-linking reaction may not sufficiently occur. When it exceeds 150° C., propylene glycol or propylene carbonate included as a solvent may participate in the surface cross-linking reaction, and an additional surface cross-linking reaction by these compounds may proceed.

When the surface cross-linking reaction by propylene glycol or propylene carbonate proceeds, the surface cross-linking density increases and thus absorbency may be significantly reduced.

The heating means for the surface cross-linking reaction is not particularly limited. It is possible to provide a thermal media thereto or provide a heat source directly thereto. At this time, usable thermal media may be a heated fluid such as steam, hot air, hot oil, and the like, but the present invention is not limited thereto. Furthermore, the temperature of the thermal media provided thereto may be properly selected in consideration of the means of the thermal media, heating speed, and target temperature of heating. Meanwhile, an electric heater or a gas heater may be used as the heat source provided directly, but the present disclosure is not limited thereto.

After the surface cross-linked layer is formed on the surface of the base resin as described above, an inorganic material may be further mixed therewith.

The inorganic material may be, for example, at least one selected from the group consisting of silica, clay, alumina, silica-alumina composite, and titania, and preferably silica.

The inorganic material may be used in an amount of 0.01 parts by weight or more, 0.05 parts by weight or more, or 0.1 parts by weight or more, and 5 parts by weight or less, 3 parts by weight or less, or 1 parts by weight or less based on 100 parts by weight of the super absorbent polymer.

Meanwhile, in order to control the properties of the super absorbent polymer to be finally commercialized, a step of classifying the super absorbent polymer obtained after the surface cross-linking step according to the particle diameter may be further performed. Preferably, a polymer having a particle diameter of about 150 to about 850 μm is classified, and then only a super absorbent polymer having such a particle diameter can be used as a final product.

The super absorbent polymer obtained by the above preparation method may satisfy the following physical properties by achieving a balance between the absorption rate (vortex time) and absorption properties.

1) a vortex time (absorption rate) at 24.0° C. is 35 seconds or less;

2) one-minute tap water absorbency, which is defined as a weight of water absorbed in the super absorbent polymer in 1 minute when 1 g of the super absorbent polymer is immersed in 2 L of tap water and swollen for 1 minute, is 115 g or more;

3) centrifuge retention capacity (CRC) measured according to the EDANA WSP 241.3 is 28 to 35 g/g, and 4) absorbency under pressure (AUP) at 0.7 psi measured according to the EDANA WSP 242.3 is 16 to 22 g/g.

5) an effective capacity (EFFC) calculated by the following Equation 1 is 22 g/g or more:

$$\text{Effective capacity (EFFC)} = \{CRC + 0.7\ psi\ AUP\}/2 \qquad \text{[Equation 1]}$$

In Equation 1,

CRC is centrifuge retention capacity (CRC) of the super absorbent polymer measured according to the EDANA WSP 241.3, and 0.7 psi AUP is absorbency under pressure (AUP) at 0.7 psi of the super absorbent polymer measured according to the EDANA WSP 242.3.

More specifically, the super absorbent polymer prepared by the above method may have a vortex time (absorption rate) by a vortex method of 35 seconds or less, 34 seconds or less, or 33 seconds or less at 24.0° C. In addition, as the lower vortex time can be evaluated as the better, the lower limit is theoretically 0 seconds, but may be 10 seconds or more, 15 seconds or more, 18 seconds or more, or 20 seconds or more. The method for measuring the vortex time of the super absorbent polymer will be described in more detail in the following experimental examples.

In addition, the super absorbent polymer may have one-minute tap water absorbency of 115 g or more, 120 g or more, or 125 g or more, and 200 g or less, 190 g or less, or 180 g or less, wherein the one-minute tap water absorbency is defined as a weight of water absorbed in the super absorbent polymer in 1 minute when 1 g of the super absorbent polymer is immersed in 2 L of tap water and swollen for 1 minute.

In addition, the super absorbent polymer may have centrifuge retention capacity (CRC) measured according to the EDANA WSP 241.3 of 29 g/g or more, or 30 g/g or more, and 34 g/g or less, or 33 g/g or less.

In addition, the super absorbent polymer may have absorbency under pressure (AUP) at 0.7 psi measured according to the EDANA WSP 242.3 of 18 g/g or more, or 19 g/g or more, and 22 g/g or less, or 20 g/g or less.

In addition, the super absorbent polymer may have an effective capacity (EFFC) calculated by the Equation 1 of 23 g/g or more, or 24 g/g or more, and 28 g/g or less, 27 g/g or less, or 26 g/g or less.

The present invention will be described in more detail in the following examples. However, these examples are provided for illustrative purposes only, and the content of the present invention is not limited by the following examples.

Preparation Examples

The aqueous dispersion of hydrophobic particles and the encapsulated foaming agent used in the following Examples were prepared in the following manner.

Preparation Example 1: Preparation of Aqueous Dispersion of Calcium Stearate Ca-st First, 50 g of water containing two or more surfactants (including polyoxyethylene alkyl ether-type nonionic surfactant and sulfate-type anionic surfactant) was added to a high shear mixer, and heated to 165° C., followed by adding 50 g of calcium stearate powder. Then, it was stirred for 30 minutes at 4000 rpm under normal pressure so that the calcium stearate could be sufficiently pulverized to obtain an aqueous dispersion Ca-st in which 50 wt % of calcium stearate having an average particle diameter of 5 μm was dispersed. At this time, the pH of the aqueous dispersion was 9.5. In addition, after the Ca-st was prepared, its average particle diameter (D50) was measured/calculated using a laser diffraction particle size measuring device (Microtrac S3500) as the particle diameter at 50% of the cumulative distribution of the number of particles.

Preparation Example 2: Preparation of Aqueous Dispersion of Zinc Stearate Zn-st First, 70 g of water containing two or more surfactants (including polyoxyethylene alkyl ether-type nonionic surfactant and sulfate-type anionic surfactant) was added to a high shear mixer, and heated to 140° C., followed by adding 30 g of zinc stearate powder. Then, it was stirred for 30 minutes at 4000 rpm under normal pressure so that the zinc stearate could be sufficiently pulverized to obtain an aqueous dispersion Zn-st in which 30 wt % of zinc stearate having an average particle diameter of 1 μm was dispersed. At this time, the pH of the aqueous dispersion was 9.5, and the average particle diameter of Zn-st was measured/calculated in the same manner as in Preparation Example 1.

Preparation Example 3: Preparation of Encapsulated Foaming Agent

As an encapsulated foaming agent used in Examples, F-36D manufactured by Matsumoto, which has a core of iso-butane and a shell of a copolymer of acrylate and acrylonitrile, was prepared. At this time, the foaming start temperature ($T_{start}$) of the F-36D is 70° C. to 80° C., and the maximum foaming temperature ($T_{max}$) is 110° C. to 120° C.

The diameter of each encapsulated foaming agent was measured as an average Feret diameter with an optical microscope. Then, an average value of the diameters of the encapsulated foaming agents was obtained and defined as the average diameter of the encapsulated foaming agent.

In addition, in order to confirm expansion characteristics of the encapsulated foaming agent, 0.2 g of the encapsulated foaming agent prepared above was applied on a glass Petri dish, and then left on a hot plate preheated to 150° C. for 10 minutes. The encapsulated foaming agent expanded slowly by heat, and this was observed with an optical microscope to determine the maximum expansion ratio and maximum expansion size of the encapsulated foaming agent in air.

A diameter of the top 10 wt % of the highly expanded particles after applying heat to the encapsulated foaming agent was defined as the maximum expansion size, and a ratio ($D_M/D_0$) of the average diameter ($D_M$) of the top 10 wt % of the highly expanded particles after applying heat to the average diameter ($D_0$) measured before applying heat to the encapsulated foaming agent was defined as the maximum expansion ratio.

The average diameter of the prepared encapsulated foaming agent before expansion was 13 μm, the maximum expansion ratio in air was about 9 times, and the maximum expansion size was about 80 to 150 μm.

EXAMPLES

Example 1

(Step 1) In a 3L glass container equipped with a stirrer and a thermometer, 100 g of acrylic acid, 0.001 g of PEGDA 400 (polyethylene glycol diacrylate 400) as an internal cross-linking agent, 0.27 g of ethylene glycol diglycidyl ether (EJ1030s), 0.008 g of diphenyl(2,4,6-trimethylbenzoyl)-phosphine oxide (I-819) as a photoinitiator and 0.2 g of sodium persulfate as a thermal initiator were added and dissolved. Then, 188 g of 22% sodium hydroxide solution was added to prepare a monomer composition (degree of neutralization: 75 mol %; solid content: 41 wt %).

(Step 2) 0.18 g of the aqueous dispersion of calcium stearate Ca-st prepared in Preparation Example 1 was added to the monomer composition such that 0.09 g of calcium stearate was added based on 100 g of acrylic acid, and 0.06 g of the encapsulated foaming agent (F-36D) was added thereto. Thereafter, the monomer composition was supplied at 500 to 2000 mL/min on a conveyor belt in which a belt having a width of 10 cm and a length of 2 m was rotated at 50 cm/min. And, at the same time as the supply of the monomer composition, ultraviolet rays having an intensity of 10 mW/cm² were irradiated to perform the polymerization reaction for 60 seconds, thereby obtaining a sheet-type hydrogel polymer having a moisture content of 55 wt %.

(Step 3) Subsequently, the hydrogel polymer in the form of a sheet was cut to a size of about 5 cm×5 cm, and then pulverized in a meat chopper to obtain hydrogel particle crumbs having a size of 1 mm to 10 mm. Thereafter, the crumbs were dried in an oven capable of changing wind direction up and down. Thereafter, it was uniformly dried by flowing hot air at 185° C. or higher from the bottom to the top for 15 minutes, and then flowing from the top to the bottom for 15 minutes, and the moisture content of the dried crumbs was set to 2% or less. After drying, pulverization was performed with a pulverizing machine, followed by classification to prepare a base resin having a diameter of 150 to 850 μm.

(Step 4) A surface cross-linking solution was prepared by mixing 4 g of water, 1.0 g of propylene glycol, 0.08 g of ethylene glycol diglycidyl ether, and 0.05 g of a polycarboxylic acid-based copolymer (a copolymer of methoxy polyethylene glycol monomethacrylate and methacrylic acid, Mw=40,000) based on 100 g of the base resin. The surface cross-linking solution was sprayed on 100 g of the obtained base resin powder for mixing, put into a container consisting of a stirrer and a double jacket, and the surface cross-linking reaction was performed at 140° C. for 35 minutes. Thereafter, the surface-treated powder was classified with a ASTM standard mesh to obtain a super absorbent polymer powder having a particle diameter of 150 to 850 μm. Then, 0.1 g of fumed silica (AEROSIL® 200) was further mixed based on 100 g of the obtained polymer powder.

Example 2

A super absorbent polymer was prepared in the same manner as in Example 1, except that 0.12 g of the encapsulated foaming agent (F-36D) was added in Example 1.

Example 3

A super absorbent polymer was prepared in the same manner as in Example 1, except that 0.3 g of the encapsulated foaming agent (F-36D) was added in Example 1.

Example 4

A super absorbent polymer was prepared in the same manner as in Example 1, except that 0.12 g of the encapsulated foaming agent (F-36D) was added in Example 1, and 0.3 g of the aqueous dispersion of zinc stearate Zn-st prepared in Preparation Example 2 was added instead of 0.18 g of Ca-st as the aqueous dispersion of hydrophobic particles so that 0.09 g of zinc stearate was added based on 100 g of acrylic acid.

Example 5

A super absorbent polymer was prepared in the same manner as in Example 2, except that 0.03 g (SDS 0.0084 g) of 28% sodium dodecyl sulfate (SDS) solution (ELOTANTE™ SL130, manufactured by LG Household & Health Care) as a foam stabilizer was further added to the monomer composition together with the aqueous dispersion of hydrophobic particles and the encapsulated foaming agent in the step 2 of Example 2.

Example 6

A super absorbent polymer was prepared in the same manner as in Example 3, except that 0.03 g (SDS 0.0084 g) of 28% sodium dodecyl sulfate (SDS) solution (ELOTANTE™ SL130, manufactured by LG Household & Health Care) as a foam stabilizer was further added to the monomer composition together with the aqueous dispersion of hydrophobic particles and the encapsulated foaming agent in the step 2 of Example 3.

Example 7

A super absorbent polymer was prepared in the same manner as in Example 2, except that 0.03 g of polyoxyethylene lauryl ether (LE-6, manufactured by Hannong Chemicals) as a foam stabilizer was further added to the monomer composition together with the aqueous dispersion of hydrophobic particles and the encapsulated foaming agent in the step 2 of Example 2.

Example 8

A super absorbent polymer was prepared in the same manner as in Example 3, except that 0.03 g of polyoxyethylene lauryl ether (LE-6, manufactured by Hannong Chemicals) as a foam stabilizer was further added to the monomer composition together with the aqueous dispersion of hydrophobic particles and the encapsulated foaming agent in the step 2 of Example 3.

Comparative Example 1

A super absorbent polymer was prepared in the same manner as in Example 1, except that the aqueous dispersion of hydrophobic particles was not used in Example 1.

Comparative Example 2

A super absorbent polymer was prepared in the same manner as in Example 2, except that the aqueous dispersion of hydrophobic particles was not used in Example 2.

Comparative Example 3

A super absorbent polymer was prepared in the same manner as in Example 3, except that the aqueous dispersion of hydrophobic particles was not used in Example 3.

Comparative Example 4

A super absorbent polymer was prepared in the same manner as in Example 5, except that the aqueous dispersion of hydrophobic particles was not used in Example 5.

Comparative Example 5

A super absorbent polymer was prepared in the same manner as in Example 7, except that the aqueous dispersion of hydrophobic particles was not used in Example 7.

Comparative Example 6

A super absorbent polymer was prepared in the same manner as in Example 1, except that 0.09 g of calcium stearate (manufactured by Duksan science) in the form of a powder having an average particle diameter of 5 μm was used based on 100 g of acrylic acid instead of the Ca-st in the form of an aqueous dispersion of hydrophobic particles in Example 1. However, calcium stearate in the form of a powder could not be dispersed in the monomer composition and remained agglomerated and floated on the neutralization solution, so that a super absorbent polymer having a uniform pore structure was not prepared.

Experimental Example 1: Measurement of Physical Properties of Super Absorbent Polymer The physical properties of super absorbent polymers prepared in Examples and Comparative Examples were evaluated in the following manner, and are shown in Table 1 below. Unless otherwise indicated, all procedures were conducted in a constant temperature and humidity room (23±0.5° C., relative humidity of 45±0.5%). In order to prevent measurement errors, an average value of three measurements was taken as measurement data. In addition, physiological saline or saline used in the evaluation of the following physical properties means a 0.9 wt % sodium chloride (NaCl) aqueous solution.

(1) Centrifuge Retention Capacity (CRC)

The centrifuge retention capacity by absorption ratio under a non-loading condition of each polymer was measured according to the EDANA WSP 241.3.

Specifically, after inserting $W_0$ (g, about 0.2 g) of the super absorbent polymer uniformly in a nonwoven fabric envelope and sealing the same, it was soaked in saline (0.9 wt %) at room temperature. After 30 minutes, the envelope was centrifuged at 250 G for 3 minutes to drain, and the weight $W_2$ (g) of the envelope was measured. Further, after carrying out the same operation without using the resin, the weight $W_1$ (g) of the envelope was measured. Then, CRC (g/g) was calculated by using the obtained weight values according to the following Equation 2.

$$CRC\ (g/g)=\{[W_2(g)-W_1(g)]/W_0(g)\}-2 \qquad \text{[Equation 2]}$$

(2) Absorbency Under Pressure (AUP)

The absorbency under pressure at 0.7 psi of each polymer was measured according to the EDANA WSP 242.3.

Specifically, a 400 mesh stainless steel screen was installed in a cylindrical bottom of a plastic having an inner diameter of 60 mm. $W_0$ (g, 0.90 g) of the super absorbent polymer was uniformly scattered on the screen at room temperature and a humidity of 50%. Thereafter, a piston which can uniformly provide a load of 0.7 psi was placed thereon. Herein, the outer diameter of the piston was slightly smaller than 60 mm, there was no gap with the inner wall of the cylinder, and jig-jog of the cylinder was not interrupted. At this time, the weight $W_3$ (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight $W_4$ (g) was measured.

Then, absorbency under pressure (g/g) was calculated by using the obtained weight values according to the following Equation 3.

$$AUP(g/g)=[W_4(g)-W_3(g)]/W_0(g)-3 \qquad \text{[Equation 3]}$$

(3) Vortex Time (Absorption Rate)

The vortex time (absorption rate) of the super absorbent polymers of Examples and Comparative Examples was measured in the following manner.

① First, 50 mL of 0.9% saline was added to a 100 mL beaker with a flat bottom using a 100 mL Mass Cylinder.

② Next, after placing the beaker in the center of a magnetic stirrer, a magnetic bar (8 mm in diameter, 30 mm in length) was put in the beaker.

③ Thereafter, the stirrer was operated such that the magnetic bar stirred at 600 rpm, and the lowermost part of vortex generated by the stirring was made to reach the top of the magnetic bar.

④ After confirming that the temperature of the saline in the beaker reached 24.0° C., 2±0.01 g of a super absorbent polymer sample was added and a stopwatch was operated at the same time. Then, the time taken until the vortex disappeared and a surface of liquid became completely horizontal was measured in seconds, and this was taken as the vortex time.

(4) One-Minute Tap Water Absorbency

The one-minute tap water absorbency of the super absorbent polymers of Examples and Comparative Examples was measured in the following manner.

① First, 1 g of a super absorbent polymer was put into a tea bag having a width of 15 cm and a length of 30 cm, and the tea bag was immersed in 2 L of tap water and then swollen for 1 minute.

② Thereafter, the tea bag containing the swollen super absorbent polymer was lifted out of tap water. After 1 minute, the weight of the tea bag without tap water was measured together with the weight of the super absorbent polymer, and a value obtained by subtracting the weight of the empty tea bag from the above weight was used as the one-minute tap water absorbency.

At this time, the tap water used had an electrical conductivity of 170 to 180 µS/cm when measured using Orion Star A222 (manufactured by Thermo Scientific).

(5) Effective Capacity (EFFC)

The effective capacity (EFFC) was calculated by the Equation 1 with the centrifuge retention capacity (CRC) and the absorbency under pressure (AUP) at 0.7 psi measured above.

TABLE 1

| | | Aqueous | | Properties of super absorbent polymer | | | | |
| | Foam stabilizer (content[1]) | dispersion of hydrophobic particles (content[1]) | Foaming agent (content[1]) | CRC (g/g) | AUP (g/g) | EFFC (g/g) | Vortex time (sec) | one-minute tap water absorbency (g) |
| --- | --- | --- | --- | --- | --- | --- | --- | --- |
| Example 1 | — | Aqueous dispersion Ca-st (0.18) | F-36D (0.06) | 31.6 | 19.3 | 25.5 | 32 | 117 |

TABLE 1-continued

|  | | Aqueous | | Properties of super absorbent polymer | | | | |
| --- | --- | --- | --- | --- | --- | --- | --- | --- |
|  | Foam stabilizer (content[1]) | dispersion of hydrophobic particles (content[1]) | Foaming agent (content[1]) | CRC (g/g) | AUP (g/g) | EFFC (g/g) | Vortex time (sec) | one-minute tap water absorbency (g) |
| Comparative Example 1 | — | — | F-36D (0.06) | 32.1 | 19.8 | 26.0 | 51 | 85 |
| Example 2 | — | Aqueous dispersion Ca-st (0.18) | F-36D (0.12) | 31.4 | 19.0 | 25.2 | 28 | 132 |
| Example 4 | | Aqueous dispersion Zn-st (0.3) | F-36D (0.12) | 31.5 | 18.9 | 25.2 | 29 | 129 |
| Example 5 | SDS (0.0084) | Aqueous dispersion Ca-st (0.18) | F-36D (0.12) | 31.1 | 19.1 | 25.1 | 28 | 138 |
| Example 7 | LE-6 (0.03) | Aqueous dispersion Ca-st (0.18) | F-36D (0.12) | 31.2 | 18.8 | 25.0 | 27 | 140 |
| Comparative Example 2 | — | — | F-36D (0.12) | 31.7 | 19.6 | 25.7 | 46 | 90 |
| Comparative Example 4 | SDS (0.0084) | — | F-36D (0.12) | 31.3 | 19.3 | 25.3 | 32 | 110 |
| Comparative Example 5 | LE-6 (0.03) | — | F-36D (0.12) | 31.1 | 19.2 | 25.2 | 32 | 113 |
| Comparative Example 6 | — | Ca-st powder (0.09) | F-36D (0.12) | 31.0 | 18.5 | 24.8 | 48 | 87 |
| Example 3 | — | Aqueous dispersion Ca-st (0.18) | F-36D (0.3) | 30.7 | 18.7 | 24.7 | 25 | 158 |
| Example 6 | SDS (0.0084) | Aqueous dispersion Ca-st (0.18) | F-36D (0.3) | 30.4 | 18.1 | 24.3 | 23 | 168 |
| Example 8 | LE-6 (0.03) | Aqueous dispersion Ca-st (0.18) | F-36D (0.3) | 30.3 | 18.2 | 24.3 | 22 | 171 |
| Comparative Example 3 | — | — | F-36D (0.3) | 30.9 | 18.6 | 24.8 | 29 | 130 |

[1]parts by weight based on 100 parts by weight of acrylic acid monomer

Referring to Table 1 above, it was confirmed that the super absorbent polymers of Examples prepared by using the aqueous dispersion of hydrophobic particles in the polymerization step exhibited a fast absorption rate (vortex time) and improved one-minute tap water absorbency without deterioration in effective capacity, compared to the super absorbent polymers of Comparative Examples prepared without using the aqueous dispersion of hydrophobic particles or using only the foam stabilizer while using the same amount of the encapsulated foaming agent. In particular, it was found that the super absorbent polymer of Example 2 showed significantly improved absorption rate (vortex time) and one-minute tap water absorbency together with improved effective capacity, compared to the super absorbent polymer of Comparative Example 6 in which the hydrophobic particles are used in the form of a powder while using the same amount of the encapsulated foaming agent.

In addition, it could be confirmed that when the foam stabilizer was used together with the encapsulated foaming agent and the aqueous dispersion of hydrophobic particles in the polymerization step, the absorption rate (vortex time) could be further improved.

Accordingly, it was confirmed that when cross-linking polymerization of a monomer was performed in the presence of an aqueous dispersion of hydrophobic particles, it was possible to prepare a super absorbent polymer with a significantly increased absorption rate (vortex time) by effectively capturing the gas generated by the foaming agent.

The invention claimed is:

1. A method for preparing a super absorbent polymer, comprising the steps of:

step 1: preparing a monomer composition containing an acrylic acid-based monomer having at least partially neutralized acidic groups and an internal cross-linking agent;

step 2: preparing a hydrogel polymer by cross-linking polymerization of the monomer composition in the presence of an aqueous dispersion of hydrophobic particles and an encapsulated foaming agent;

step 3: forming a powder-type base resin by drying and pulverizing the hydrogel polymer; and step 4: forming a surface cross-linked layer by further cross-linking the surface of the powder-type base resin in the presence of a surface cross-linking agent, wherein the aqueous dispersion of hydrophobic particles is a colloidal solution in which hydrophobic particles are dispersed by a surfactant, the hydrophobic particles contain a metal salt of a C7 to C24 fatty acid, and the encapsulated foaming agent has a structure having a core comprising a hydrocarbon and a shell formed of a thermoplastic resin surrounding the core.

2. The method for preparing a super absorbent polymer of claim 1, wherein the super absorbent polymer satisfies the following 1) and 2):

1) a vortex time at 24.0° C. is 35 seconds or less; and 2) one-minute tap water absorbency, which is defined as a weight of water absorbed in the super absorbent polymer in 1 minute when 1 g of the super absorbent polymer is immersed in 2 L of tap water and swollen for 1 minute, is 115 g or more.

3. The method for preparing a super absorbent polymer of claim 1, wherein the hydrophobic particles are at least one metal salt of stearic acid selected from the group consisting of calcium stearate, magnesium stearate, sodium stearate, zinc stearate and potassium stearate.

4. The method for preparing a super absorbent polymer of claim 1, wherein the hydrophobic particles have an average particle diameter of 0.5 μm to 20 μm.

5. The method for preparing a super absorbent polymer of claim 1, wherein the hydrophobic particles are used in an amount of 0.005 to 0.4 parts by weight based on 100 parts by weight of the acrylic acid-based monomer.

6. The method for preparing a super absorbent polymer of claim 1, wherein the surfactant comprises a nonionic surfactant and an anionic surfactant.

7. The method for preparing a super absorbent polymer of claim 1, wherein the encapsulated foaming agent has an average diameter before expansion of 5 to 30 μm, and a maximum expansion ratio in air of 5 to 15 times.

8. The method for preparing a super absorbent polymer of claim 1, wherein the encapsulated foaming agent has a maximum expansion size in air of 20 to 190 μm.

9. The method for preparing a super absorbent polymer of claim 1, wherein the hydrocarbon is at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane.

10. The method for preparing a super absorbent polymer of claim 1, wherein the thermoplastic resin is a polymer formed from at least one monomer selected from the group consisting of a (meth)acrylate-based compound, a (meth) acrylonitrile-based compound, an aromatic vinyl compound, a vinyl acetate compound and a halogenated vinyl compound.

11. The method for preparing a super absorbent polymer of claim 1, wherein the encapsulated foaming agent and the hydrophobic particles are used in a weight ratio of 1:0.1 to 1:3.5.

12. The method for preparing a super absorbent polymer of claim 1, wherein in step 2, the cross-linking polymerization is performed in the presence of the aqueous dispersion of hydrophobic particles, the encapsulated foaming agent, and further at least one foam stabilizer selected from the group consisting of an alkyl sulfate-based compound and a polyoxyethylene alkyl ether-based compound.

13. The method for preparing a super absorbent polymer of claim 12, wherein the encapsulated foaming agent and the foam stabilizer are used in a weight ratio of 1:0.01 to 1:0.5.

14. The method for preparing a super absorbent polymer of claim 1, wherein the surface cross-linking agent is the same as the internal cross-linking agent.

15. The method for preparing a super absorbent polymer of claim 1, wherein the super absorbent polymer has an effective capacity (EFFC) calculated by the following Equation 1 of 22 g/g or more:

$$\text{Effective capacity (EFFC)} = \{\text{CRC} + 0.7 \text{ psi AUP}\}/2 \qquad \text{[Equation 1]}$$

in Equation 1,

CRC is centrifuge retention capacity (CRC) of the super absorbent polymer measured according to EDANA WSP 241.3, and 0.7 psi AUP is absorbency under pressure (AUP) at 0.7 psi of the super absorbent polymer measured according to EDANA WSP 242.3.

16. The method for preparing a super absorbent polymer of claim 1, wherein the acrylic acid-based monomer is included in an amount of about 20 to 60 wt % based on a total weight of the monomer composition.

17. The method for preparing a super absorbent polymer of claim 1, wherein the hydrophobic particles are included in an amount of 10 to 70 wt % based on a total weight of the aqueous dispersion.

18. The method for preparing a super absorbent polymer of claim 1, wherein the aqueous dispersion of hydrophobic particles has a pH of 7 or more.

19. The method for preparing a super absorbent polymer of claim 1, wherein the encapsulated foaming agent is included in an amount of 0.005 to 1 part by weight based on 100 parts by weight of the acrylic acid-based monomer.

20. The method for preparing a super absorbent polymer of claim 1, wherein the super absorbent polymer has a centrifuge retention capacity (CRC) measured according to EDANA WSP 241.3 of 28 to 35 g/g, and an absorbency under pressure (AUP) at 0.7 psi measured according to EDANA WSP 242.3 of 16 to 22 g/g.

* * * * *